United States Patent
Kleckler et al.

(10) Patent No.: US 10,815,893 B2
(45) Date of Patent: Oct. 27, 2020

(54) COMBUSTOR ASSEMBLY WITH PRIMARY AND AUXILIARY INJECTOR FUEL CONTROL

(71) Applicant: Woodward, Inc., Fort Collins, CO (US)

(72) Inventors: Joel W. Kleckler, Rockton, IL (US); Bidhan Dam, Zeeland, MI (US)

(73) Assignee: Woodward, Inc., Fort Collins, CO (US)

( * ) Notice: Subject to any disclaimer, the term of this patent is extended or adjusted under 35 U.S.C. 154(b) by 309 days.

(21) Appl. No.: 15/862,379

(22) Filed: Jan. 4, 2018

(65) Prior Publication Data

US 2019/0203645 A1 Jul. 4, 2019

(51) Int. Cl.
| | | |
|---|---|---|
| *F02C 7/232* | (2006.01) | |
| *F23R 3/28* | (2006.01) | |
| *F02C 9/36* | (2006.01) | |
| *F02C 3/06* | (2006.01) | |
| *F02C 9/26* | (2006.01) | |

(Continued)

(52) U.S. Cl.
CPC .............. *F02C 7/232* (2013.01); *F02C 3/06* (2013.01); *F02C 7/22* (2013.01); *F02C 7/222* (2013.01); *F02C 7/228* (2013.01); *F02C 7/26* (2013.01); *F02C 9/263* (2013.01); *F02C 9/34* (2013.01); *F02C 9/36* (2013.01); *F23R 3/28* (2013.01); *F23R 3/34* (2013.01)

(58) Field of Classification Search
CPC .... F23R 3/28; F23R 3/34; F23R 3/343; F02C 7/26; F02C 7/264; F02C 7/222; F02C 7/228; F02C 7/232; F02C 7/263; F02C 9/34; F02C 9/263; F02C 9/36; F23C 2900/03005

See application file for complete search history.

(56) References Cited

U.S. PATENT DOCUMENTS

| | | | | |
|---|---|---|---|---|
| 2,540,642 A | * | 2/1951 | Allen | ............... F02C 7/264 |
| | | | | 60/786 |
| 2,543,366 A | * | 2/1951 | Haworth | ............ F02C 7/264 |
| | | | | 60/39.094 |

(Continued)

FOREIGN PATENT DOCUMENTS

| | | |
|---|---|---|
| EP | 1849975 | 10/2007 |
| EP | 1985863 | 10/2008 |
| GB | 618688 | 2/1949 |

OTHER PUBLICATIONS

International Search Report and Written Opinion in International Application No. PCT/US2018/066571, dated Apr. 9, 2019, 14 pages.

*Primary Examiner* — Alain Chau (74) *Attorney, Agent, or Firm* — Fish & Richardson P.C.

(57) ABSTRACT

A gas turbine combustor assembly includes: a primary combustion chamber in fluid communication with a primary fuel outlet of a primary fuel injector; a torch igniter coupled to the primary combustion chamber, the torch igniter including an auxiliary combustion chamber and an auxiliary fuel injector having an auxiliary fuel outlet in fluid communication with the auxiliary combustion chamber; and a fuel circuit including a first supply flowpath between a fuel inlet and the primary fuel injector, a second supply flowpath between the fuel inlet and the auxiliary fuel injector, and a bypass flowpath between the auxiliary fuel injector and the primary fuel injector.

23 Claims, 4 Drawing Sheets

(51) Int. Cl.
  *F02C 7/22* (2006.01)
  *F02C 7/228* (2006.01)
  *F02C 7/26* (2006.01)
  *F23R 3/34* (2006.01)
  *F02C 9/34* (2006.01)

(56) References Cited

U.S. PATENT DOCUMENTS

| | | | | |
|---|---|---|---|---|
| 2,847,826 A * | 8/1958 | Howes | | F02C 7/264 60/39.826 |
| 2,864,234 A * | 12/1958 | Seglem | | F02C 7/264 60/39.826 |
| 2,967,224 A * | 1/1961 | Irwin | | F02C 7/264 361/266 |
| 3,009,321 A * | 11/1961 | Jones | | F23R 3/007 60/39.821 |
| 3,057,155 A * | 10/1962 | Rizk | | F02C 7/27 60/788 |
| 3,126,942 A | 3/1964 | Tyler | | |
| 3,954,389 A * | 5/1976 | Szetela | | F02C 7/264 431/353 |
| 4,112,675 A * | 9/1978 | Pillsbury | | F02C 7/26 431/268 |
| 4,141,213 A * | 2/1979 | Ross | | F23M 5/085 431/285 |
| 4,860,533 A * | 8/1989 | Joshi | | F02C 7/264 60/776 |
| 5,528,897 A * | 6/1996 | Halin | | F02C 7/232 60/39.094 |
| 7,726,112 B2 * | 6/2010 | Dooley | | F01D 21/06 60/39.094 |
| 7,841,184 B2 * | 11/2010 | Dooley | | F02C 7/222 60/733 |
| 8,756,937 B2 * | 6/2014 | Dooley | | F01D 21/06 60/772 |
| 9,080,772 B2 * | 7/2015 | Prociw | | F23R 3/14 |
| 2007/0175219 A1 * | 8/2007 | Cornwell | | F23R 3/343 60/737 |
| 2007/0245744 A1 * | 10/2007 | Dooley | | F01D 21/06 60/772 |
| 2008/0256954 A1 * | 10/2008 | Dooley | | F02C 7/222 60/733 |
| 2010/0199681 A1 * | 8/2010 | Dooley | | F01D 21/06 60/776 |
| 2011/0033806 A1 * | 2/2011 | Milosavljevic | | F23R 3/346 431/9 |
| 2011/0041508 A1 * | 2/2011 | Karlsson | | F23R 3/346 60/772 |
| 2011/0113787 A1 * | 5/2011 | Milosavljevic | | F23R 3/343 60/776 |
| 2014/0245739 A1 * | 9/2014 | Dooley | | F01D 21/06 60/734 |
| 2014/0245745 A1 * | 9/2014 | Dooley | | F01D 21/06 60/776 |
| 2016/0047318 A1 * | 2/2016 | Dam | | F02C 7/264 60/776 |
| 2019/0010872 A1 * | 1/2019 | Dam | | F23R 3/34 |
| 2019/0010873 A1 * | 1/2019 | Dam | | F23R 3/286 |

* cited by examiner

COMBUSTOR ASSEMBLY WITH PRIMARY AND AUXILIARY INJECTOR FUEL CONTROL

TECHNICAL FIELD

This specification generally relates to combustor assemblies for gas turbine engines that incorporate torch igniters to facilitate ignition in a main combustion chamber. More specifically, embodiments described in this specification involve systems, apparatuses, and methods for controlling fuel flow to the torch igniter and the burners of the main combustion chamber.

BACKGROUND

The gas turbine engine is the preferred class of internal combustion engine for many high power applications. Fundamentally, the gas turbine engine features an upstream rotating compressor coupled to, and typically driven by, a downstream turbine, with a combustion chamber residing in-between the two rotary components. A torch igniter is a device that may be used to ignite the primary combustor of a gas turbine engine. In some applications, the torch igniter has advantages over conventional spark igniters, because it can provide larger amounts of energy release to the main combustor, and thus, is capable of lighting the engine in a more reliable manner, over a wider environment range. To achieve this, the torch igniter requires an auxiliary source of fuel and air, as well as an ignition source. Auxiliary airflow is typically obtained from the plenum downstream of the engine's compressor or from an external source of compressed air; and the auxiliary fuel is obtained from the fuel-metering unit or manifold, or from an independent fuel source.

SUMMARY

In one aspect, a gas turbine combustor assembly includes: a primary combustion chamber in fluid communication with a primary fuel outlet of a primary fuel injector; a torch igniter coupled to the primary combustion chamber, the torch igniter including an auxiliary combustion chamber and an auxiliary fuel injector having an auxiliary fuel outlet in fluid communication with the auxiliary combustion chamber; and a fuel circuit including a first supply flowpath between a fuel inlet and the primary fuel injector, a second supply flowpath between the fuel inlet and the auxiliary fuel injector, and a bypass flowpath between the auxiliary fuel injector and the primary fuel injector.

In another aspect, a gas turbine engine includes: a compressor configured to produce a high-pressure airflow; a turbine coupled to the compressor and configured to drive the compressor; and a combustor assembly configured to receive the high-pressure airflow from the compressor and produce a high-temperature, high-pressure airflow to the turbine. The combustor assembly includes: a primary combustion chamber in fluid communication with a primary fuel outlet of a primary fuel injector; a torch igniter coupled to the primary combustion chamber, the torch igniter including an auxiliary combustion chamber and an auxiliary fuel injector having an auxiliary fuel outlet in fluid communication with the auxiliary combustion chamber; and a fuel circuit including a first supply flowpath between a fuel inlet and the primary fuel injector, a second supply flowpath between the fuel inlet and the auxiliary fuel injector, and a bypass flowpath between the auxiliary fuel injector and the primary fuel injector.

In some examples, the auxiliary fuel injector is configured to receive fuel flowing through the second flowpath, eject a portion of the fuel flow through the auxiliary fuel outlet and recirculate another portion of the fuel flow to the bypass flowpath.

In some examples, the first supply flowpath, the second supply flowpath, and the bypass flowpath are each defined by separate fluid conduits. In some examples, the bypass flowpath is unencumbered by flow regulation device. In some examples, the bypass flowpath includes an electromechanically controlled flow regulation device.

In some examples, the bypass flowpath provides a direct line of fluid communication between the auxiliary fuel injector and the primary fuel injector. In some examples, the bypass flowpath is configured to direct a bypass flow of fuel from the auxiliary fuel injector to the primary fuel injector.

In some examples, the fuel circuit further includes a flow regulator configured to simultaneously adjust the rate of fuel flow from the fuel inlet to the respective first and second supply flowpaths, and the rate of fuel flow along the bypass flowpath. In some examples, the primary fuel injector includes one of multiple fuel injectors coupled to a common fuel intake manifold residing on the first supply flowpath downstream of the flow regulator. In some examples, the bypass flowpath is in fluid communication with the fuel intake manifold. In some examples, the flow regulator includes a spring-biased piston valve having an inlet port in fluid communication with the fuel inlet and a reference port in fluid communication with a reference pressure source, and a pressure difference between the inlet port and the reference port urges the piston against a biasing force of the spring to control fuel flow through the valve to the first and second supply flowpaths.

In some examples, the second supply flowpath includes an electromechanically controlled flow regulation device.

In yet another aspect, a method of delivering fuel to a torch igniter and a primary combustor in a combustor assembly includes the steps of: receiving a total burn flow of fuel; routing a torch supply fuel flow to an auxiliary fuel injector of the torch igniter, the torch supply fuel flow including at least a portion of the total burn flow; ejecting a discharge portion of the torch supply fuel flow into an auxiliary combustion chamber of the torch igniter; and recirculating a bypass portion of the torch supply fuel flow to a primary fuel injector of the primary combustor along a bypass flowpath providing a direct line of fluid communication between the auxiliary fuel injector and the primary fuel injector.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

In certain gas turbine engines, a torch igniter ignites fuel released by combustor nozzles in a combustor of the engine to produce heated combustion products. The heated combustion products are, in turn, expanded through a turbine of the engine to produce torque. Reliable ignition and flame propagation around the primary combustor's fuel injector nozzles across a broad range of operating conditions in different ambient environments is paramount to the design of the combustor. A bypass fuel injector is a key component in many designs that enables the torch ignitor to reliably achieve light-off and maintain stable torch burn throughout a wide range of flow requirements and operating conditions.

One advantage gained from employing a bypass fuel injector is a relatively large "turndown ratio"—i.e., the ratio of maximum fuel flow capacity to minimum fuel flow capacity—without significant spray quality degradation (e.g., poor atomization) or coking of the nozzle outlet. Bypass fuel injectors may achieve turndown ratios of 8:1 or higher, compared to ratios of 5:1 or lower provided by so-called "simplex" fuel injectors. While clearly beneficial, bypass fuel injectors also raise significant challenges. One of these challenges is fuel control. In a bypass fuel injector, lower discharge fuel flow rates are provided by siphoning off or "bypassing" certain amounts of the fuel supplied to the injector. Controlling the bypass flow is a design challenge often resolved using hardware that imparts substantial cost and weight penalties on the design and/or using complex control logic that is often inaccurate. Bypass fuel is typically routed in a unidirectional manner to a sump reservoir, and is not directly reintroduced to the fuel circuit. Accounting for this parasitic loss of fuel flow complicates the flow control logic and reduces accuracy of the same. Inaccurate governing of fuel flow can cause flame instability, damage components of the combustor, degrade fuel efficiency, and/or induce poor emissions performance.

Embodiments described in this specification involve an alternative approach to fuel control that recycles bypass fuel flow by routing the fuel to the primary combustor fuel nozzles. This approach eliminates the need for a sump vessel, as well as the associated costly/heavy hardware, and improves the efficiency and accuracy of the control logic by eliminating parasitic flow.

Figure 1:
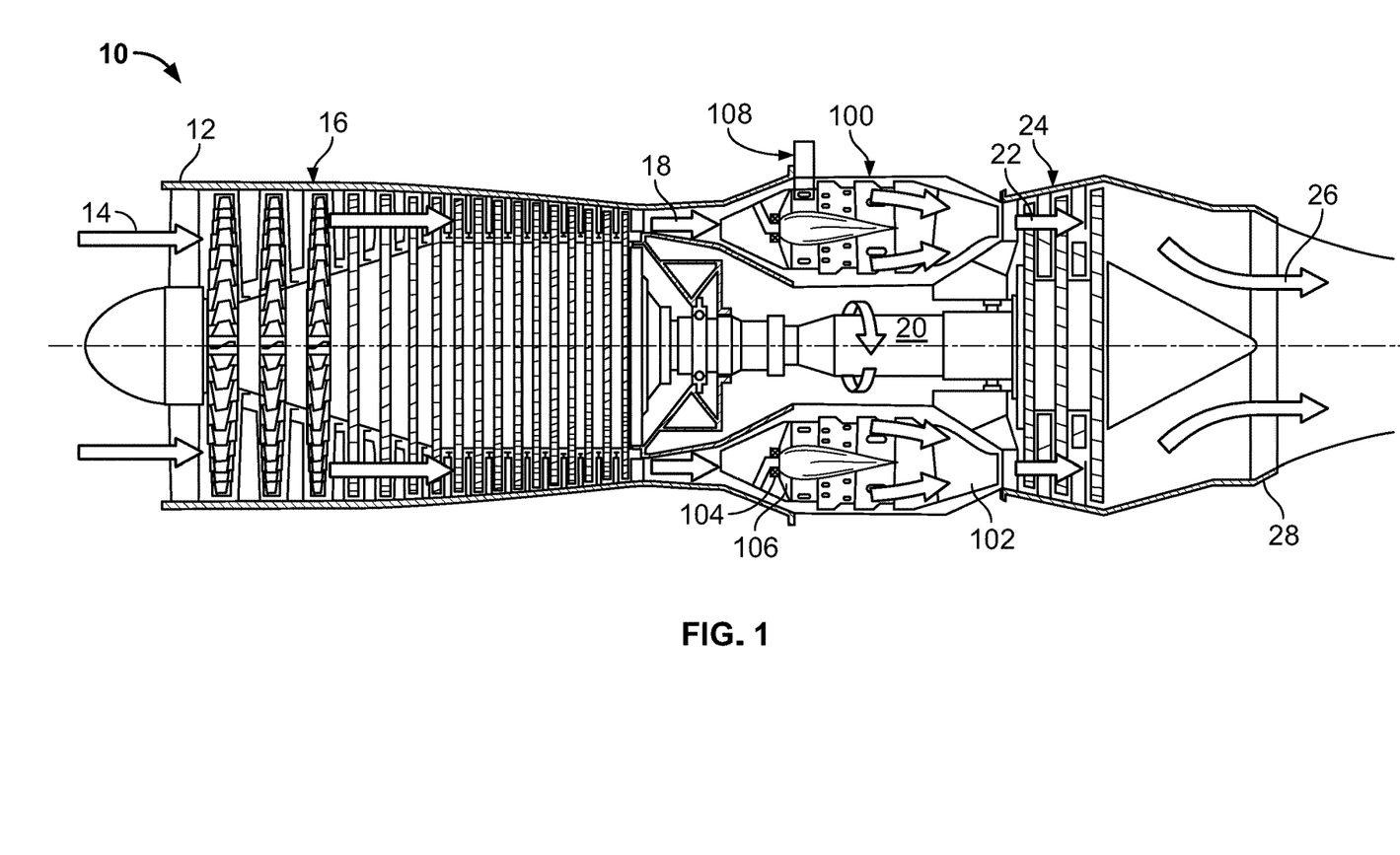
FIG. 1 is a half, side cross-sectional view of an example gas turbine engine.

FIG. 1 depicts an example gas turbine engine 10. In this example, gas turbine engine 10 is a turbojet-type gas turbine that could be used, for example, to power jet aircrafts. The techniques and concepts described throughout this specification, however, are not so limited, and can be incorporated in the design of various other types of gas turbine engines (e.g., turbofan, turboprop, turboshaft, or industrial/marine engines).

As shown, gas turbine engine 10 generally facilitates a continuous axial flow of gas. That is, gas generally flows through gas turbine engine 10 in the axially downstream direction indicated by the arrows in FIG. 1. Gas turbine engine 10 includes an intake 12 that receives and directs ambient air 14 to a compressor 16. Ambient air 14 is drawn through multiple stages of compressor 16. High-pressure air 18 exiting compressor 16 is introduced to a combustor 100. In certain instances, combustor 100 is an annular combustor circumscribing the engine's main shaft 20 or a can-type combustor positioned radially outward of the shaft.

Combustor 100 includes a combustion shield 102, multiple fuel injectors 104, a combustor dome 106, and a torch igniter system 108. At combustor 100, high-pressure air 18 is mixed with liquid or gaseous fuel (not shown) and ignited by torch igniter system 108 to produce heated combustion products 22. Combustion products 22 are passed through multiple stages of a turbine 24. Turbine 24 extracts energy from the high-pressure, high-temperature combustion products 22. Energy extracted from combustion products 22 by turbine 24 drives compressor 16, which is coupled to the turbine by main shaft 20. Exhaust gas 26 leaving turbine 24 is accelerated into the atmosphere through an exhaust nozzle 28 to provide thrust or propulsion power or energy for electrical power generation.

Figure 2:
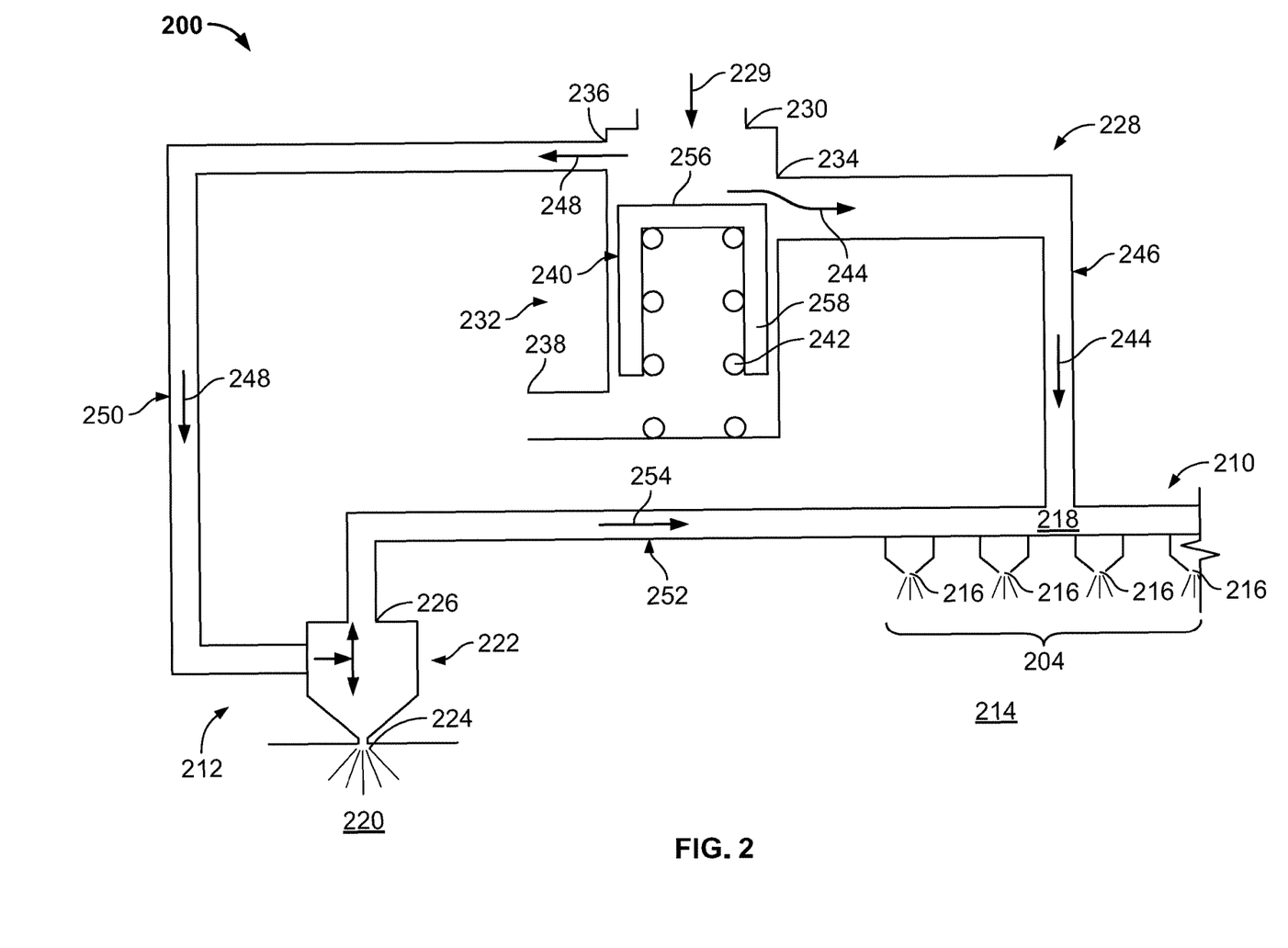
FIG. 2 is a plan diagram of a first example combustor assembly.

FIG. 2 illustrates an example combustor assembly 200 that can be used in gas turbine engine 10 of FIG. 1. Combustor assembly 200 includes a primary combustor 210 and a torch ignitor 212. Primary combustor 210 includes a primary combustion chamber 214 and a set of primary fuel injectors 204. Each of primary fuel injectors 204 includes a primary fuel outlet 216 that discharges fuel into primary combustion chamber 214. Fuel flow is provided to primary fuel injectors 204 by a fuel intake manifold 218.

Torch ignitor 212 includes an auxiliary combustion chamber 220 and an auxiliary fuel injector 222. Auxiliary fuel injector 222 includes an auxiliary fuel outlet 224 that discharges fuel into auxiliary combustion chamber 220 and a bypass fuel outlet 226 that directs fuel flow bypassing auxiliary fuel outlet 224 away from auxiliary fuel injector 222.

Combustor assembly 200 further includes a fuel circuit 228 that receives a pressurized flow of fuel 229 at a fuel inlet port 230 from a fuel source (not shown) and distributes the fuel to primary combustor 210 and torch igniter 212. Fuel flow 229 represents the total amount of fuel available to ignite and sustain a flame in torch igniter 212 and primary combustor 210. Thus, fuel flow 229 can be referred to as the "total burn flow." Use of the term "flow" throughout this specification refers to the fuel itself and the rate at which the fuel is flowing (e.g., the volumetric or mass flow rate).

Fuel circuit 228 includes a flow regulator 232 that facilitates distribution of total burn flow 229 to torch igniter 212 and primary combustor 210. In this example, flow regulator 232 is a directional fuel metering valve including a first discharge port 234, a second discharge port 236, a reference port 238, and a piston 240 biased by a spring 242. As shown, first discharge port 234 directs a first fuel flow 244 along a first supply flowpath 246 leading to fuel intake manifold 218 of primary fuel injectors 204; and second discharge port 236 directs a second fuel flow 248 along a second supply flowpath 250 leading to auxiliary fuel injector 222.

Fuel circuit 228 further includes a bypass flowpath 252 extending between auxiliary fuel injector 222 of torch igniter 212 and fuel intake manifold 218 of primary fuel injectors 204. In this example, bypass flowpath 252 provides a direct line of fluid communication between auxiliary fuel injector 222 and primary fuel injectors 204 fed by fuel intake manifold 218. The phrase "direct line of fluid communication" in this context means that fuel flows from auxiliary fuel injector 222 to fuel intake manifold 218 without being diverted out of fuel circuit 228. The direct line of fluid communication provided by bypass flowpath 252 prevents the accumulation of parasitic losses by facilitating the recirculation of bypass fuel flow 254. As such, the combination of first supply flowpath 246, second supply flowpath 250, and bypass flowpath 252, each of which is defined by a separate fluid conduit (or series of interconnected fluid conduits), form a recirculating flow loop without substantial parasitic losses, which simplifies the control logic required to accurately govern and distribute total burn flow.

Flow regulator 232 is a passively operated device. In the context of this specification, passive operation means that flow regulator 232 performs its intended functions absent powered electrical or electromechanical control components such as actuators and solenoids. Rather, flow regulator 232 performs its fuel flow distribution function in response to the magnitude of total burn flow 229. Note that the term "magnitude" in this context refers to the magnitude of the flow rate of fuel, which corresponds to the magnitude of the fluid pressure. When total burn flow 229 is introduced to fuel circuit 228 through fuel inlet port 230, its fluid pressure acts against the crown 256 of piston 240 in a direction opposing the biasing forced provided by spring 242. The net fluid pressure force applied against piston 240 corresponds to the difference in pressure on either side of crown 256—i.e., the difference between the pressure of total burn flow 229 and the pressure of reference port 238.

Figure 3A:
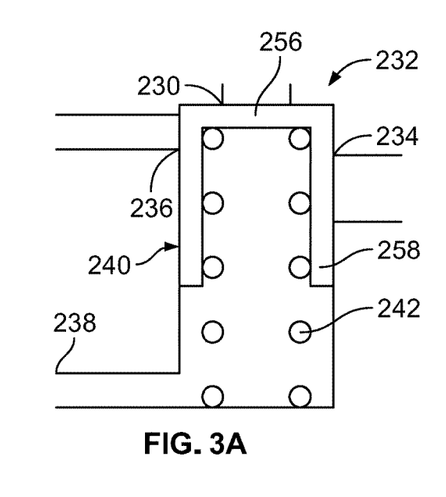
FIGS. 3A-3D are diagrams of the flow regulator illustrated in FIG. 2 depicting the flow regulator in different states of operation.

When the fluid pressure force overwhelms the biasing force, piston 240 is urged towards a fully open position (see FIG. 3D) where first discharge port 234 and second discharge port 236 are entirely unobstructed by the skirt 258 of piston 240. Conversely, when the biasing force overwhelms the fluid pressure force, piston 240 is urged towards a fully closed position (see FIG. 3A) where first discharge port 234 and second discharge port 236 are completely obstructed by piston skirt 258. Piston 240 remains stationary between the fully open and fully closed positions (see FIGS. 3B-3C) when the fluid pressure force and biasing force reach equilibrium. The biasing force applied by spring 242 varies (linearly or non-linearly) according to the degree of displacement. Thus, the fluid pressure force induced by total burn flow 229 must reach a predetermined threshold to advance piston 240 from the fully closed position, and must increase beyond this threshold to effect further advancement towards the fully open position. As discussed below, controlled movement of piston 240 between the fully open and fully closed positions in this manner can simultaneously adjust the magnitude of first fuel flow 244 and second fuel flow 248 (e.g., the volumetric or mass flow rate).

Figure 3B:
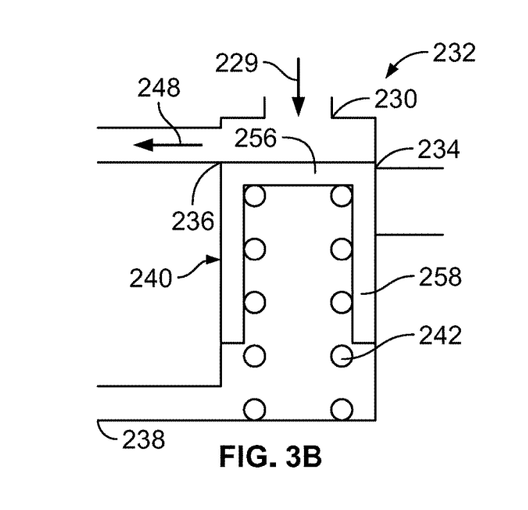
Figure 3C:
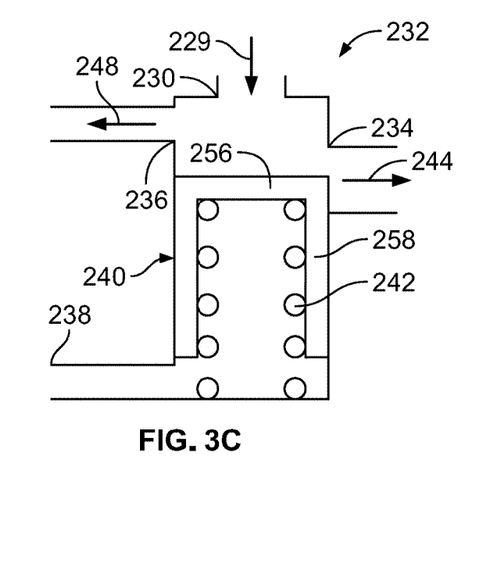

Piston 240 initially resides in the fully closed position (FIG. 3A) due to the absence of total burn flow 229. As noted above, when piston 240 is in the fully closed position, first discharge port 234 and second discharge port 236 are completely obstructed by piston skirt 258, and therefore the first fuel flow 244 and second fuel flow 248 are non-existent. When the magnitude of total burn flow 229 increases beyond the predetermined threshold, such as during a low-flow condition of the engine, piston 240 moves to a first intermediate position (FIG. 3B). In the first intermediate position, piston skirt 258 is removed from second discharge port 236 but continues to obstruct first discharge port 234. As such, the entirety of total burn flow 229 is directed through second discharge port 236 to second supply flowpath 250 as second fuel flow 248. Second fuel flow 248 is directed by second supply flowpath 250 to auxiliary fuel injector 222 of torch igniter 212. One portion of second fuel flow 248 is ejected into auxiliary combustion chamber 220 as an atomized spray from auxiliary fuel outlet 224, and another portion of second fuel flow 248 bypassing auxiliary fuel outlet 224 is directed through bypass fuel outlet 226 to bypass flowpath 252 as bypass fuel flow 254.

The proportion of second fuel flow 248 discharged by auxiliary fuel outlet 224 compared to bypass fuel flow 254 is influenced by the pressure difference between auxiliary fuel injector 222 and fuel intake manifold 218. Further, in this example, because bypass flowpath 252 is unencumbered by a flow regulating device (e.g., a valve or pump), the pressure differential entirely dictates the magnitude of bypass fuel flow 254. At the first intermediate position of piston 240, the pressure at fuel intake manifold 218 is far below that of auxiliary fuel injector 222 because first discharge port 234 is obstructed, which prevents pressurized fuel flow to manifold 218 via first supply flowpath 246. This large pressure difference places auxiliary fuel injector 222 in a high-bypass condition, which results in a small amount of fuel discharge from auxiliary fuel outlet 224 and a comparatively large bypass fuel flow 254 provided to fuel intake manifold 218.

In response to further increasing the magnitude of total burn flow 229, piston 240 advances from the first intermediate position (FIG. 3B) to a second intermediate position (FIG. 3C), which may occur at a mid-flow condition of the engine. In the second intermediate position, second discharge port 236 is unobstructed and first discharge port 234 is partially unobstructed, allowing one portion of total burn flow 229 to be directed through second discharge port 236 to second supply flowpath 250 as second fuel flow 248 and another portion of total burn flow 229 to be directed through first discharge port 234 to first supply flowpath 246 as first fuel flow 244. The receipt of first fuel flow 244 by fuel intake manifold 218 via first supply flowpath 246 raises the pressure at manifold 218, and therefore decreases the pressure differential between auxiliary fuel injector 222 and manifold 218. The reduced pressure differential reduces the proportional magnitude of bypass fuel flow 254 and increases the amount of second fuel flow 248 discharged to auxiliary combustion chamber 220 by auxiliary fuel outlet 224.

Figure 3D:
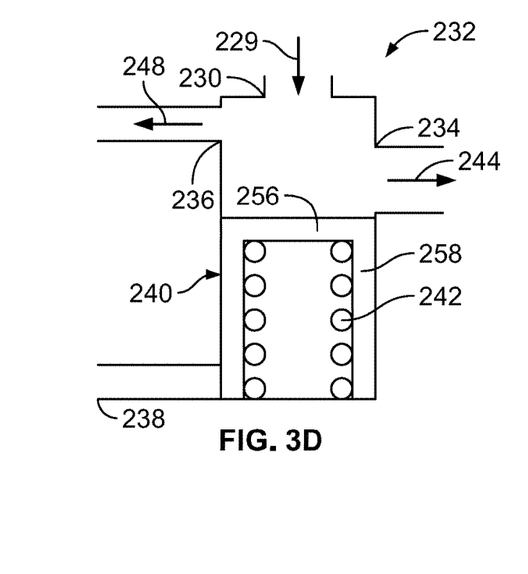

Continued increasing of total burn flow 229, such as at a high-flow engine condition, causes piston 240 to advance from the second intermediate position (FIG. 3C) to the fully open position (FIG. 3D). As noted above, in the fully open position, first discharge port 234 and second discharge port 236 are completely unobstructed by piston skirt 258. The complete removal of an obstruction from second discharge port 236 further increases the relative amount of total burn flow 229 delivered to fuel intake manifold 218 as first fuel flow 244, as compared to the amount of total burn flow 229 delivered to auxiliary fuel injector 222 as second fuel flow 248. In some examples, the increased magnitude of first fuel flow 244 effectively eliminates the pressure differential between auxiliary fuel injector 222 and fuel intake manifold 218, which results in little (if any) bypass fuel flow 254. In some examples, the pressure in fuel intake manifold 218 induced by the augmented first fuel flow 244 causes a reverse bypass condition where fuel flow through bypass flowpath 252 is conveyed from intake manifold 218 to auxiliary fuel outlet 224 of auxiliary fuel injector 222 via bypass fuel outlet 226.

In this example, the above-described components of fuel circuit 228 are tuned to enable self-regulation of fuel flow to torch igniter 212 and primary combustor 210 based on pressure equilibrium principles. At each level of total burn flow 229—i.e., low-flow, mid-flow, and high-flow conditions—flow regulator 232 operates passively to divide total burn flow 229 between torch igniter 212 and primary combustor 210. Bypass flowpath 252 enables further divvying up of fuel flow based on pressure differential. This relieves the control logic from having to account for the parasitic loss of bypass flow from auxiliary fuel injector 222 when determining and tracking the magnitude of total burn flow 229.

Figure 4:
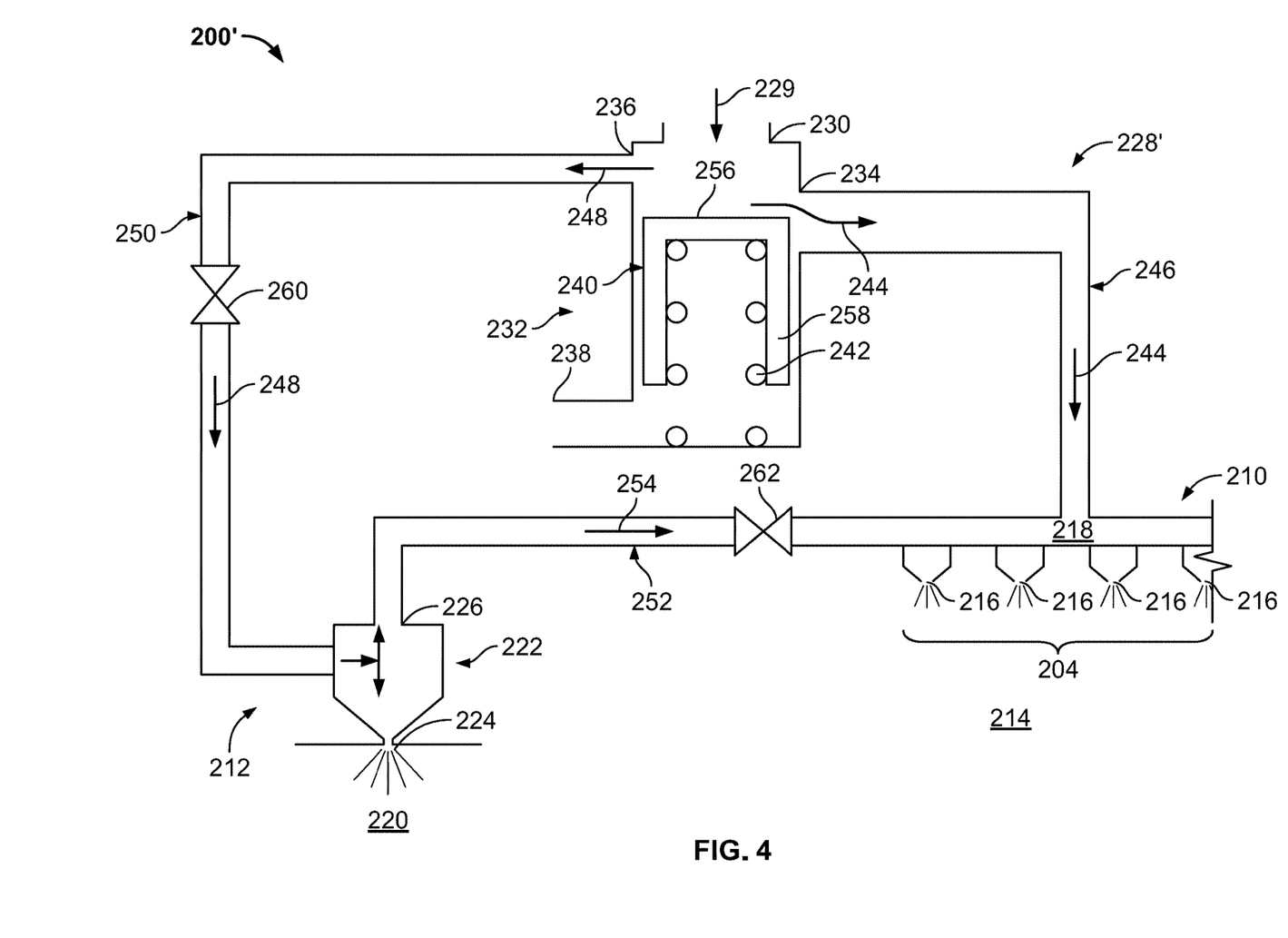
FIG. 4 is a plan diagram of a second example combustor assembly.

FIG. 4 illustrates a second example combustor assembly 200' that is similar to the combustor assembly 200 of FIG. 2. In this example, fuel circuit 228' further includes a supply valve 260 residing on second supply flowpath 250 and a bypass valve 262 residing on bypass flowpath 252. These valves provide additional degrees of freedom to fuel circuit 228' by providing flow control devices that operate independent of the magnitude of total burn flow 229. This enables fuel circuit 228' to establish a wider range of turndown ratios at auxiliary fuel injector 222 while maintaining the benefit of simplified and accurate control logic derived from the elimination parasitic losses.

Supply valve 260 and bypass valve 262 may be provided in the form of electromechanically controlled valves (e.g., solenoid-driven valves). For example, supply valve 260 could be a metering valve that regulates the magnitude of second fuel flow 248. Bypass valve 262 could also be a metering valve regulating bypass fuel flow 254, or a check valve that inhibits fuel flow in a specific direction during certain engine operating conditions. For example, bypass valve 262 could be actuated to prevent reverse bypass flow from fuel intake manifold 218 to auxiliary fuel injector 222 during a high-flow engine condition.

A number of embodiments of the invention have been described. Nevertheless, it will be understood that various modifications may be made without departing from the spirit and scope of the inventions.

What is claimed is:

1. A gas turbine combustor assembly, comprising:
   a primary combustion chamber in fluid communication with a primary fuel outlet of a primary fuel injector;
   a torch igniter coupled to the primary combustion chamber, the torch igniter comprising an auxiliary combustion chamber and an auxiliary fuel injector having an auxiliary fuel outlet in fluid communication with the auxiliary combustion chamber; and
   a fuel circuit comprising a first supply flowpath between a fuel inlet and the primary fuel injector, a second supply flowpath between the fuel inlet and the auxiliary fuel injector, and a bypass flowpath extending from the auxiliary fuel injector directly to the primary fuel injector,
   wherein the auxiliary fuel injector is configured to receive fuel flowing through the second supply flowpath, eject a portion of the fuel flow through the auxiliary fuel outlet and recirculate another portion of the fuel flow to the bypass flowpath.

2. The combustor assembly of claim 1, wherein the first supply flowpath, the second supply flowpath, and the bypass flowpath are each defined by separate fluid conduits.

3. The combustor assembly of claim 2, wherein the bypass flowpath is configured such that a pressure difference between the auxiliary fuel injector and the primary fuel injector defines a proportion of the fuel flow ejected through the auxiliary fuel outlet and the fuel flow recirculated to the bypass flowpath.

4. The combustor assembly of claim 2, wherein the bypass flowpath comprises an electromechanically controlled flow regulation device.

5. The combustor assembly of claim 1, wherein the bypass flowpath provides a direct line of fluid communication between the auxiliary fuel injector and the primary fuel injector.

6. The combustor assembly of claim 5, wherein the bypass flowpath is configured to direct a bypass flow of fuel from the auxiliary fuel injector to the primary fuel injector.

7. The combustor assembly of claim 1, wherein the fuel circuit further comprises a flow regulator configured to simultaneously adjust the rate of fuel flow from the fuel inlet to the respective first and second supply flowpaths, and the rate of fuel flow along the bypass flowpath.

8. The combustor assembly of claim 7, wherein the primary fuel injector comprises one of multiple fuel injectors coupled to a common fuel intake manifold residing on the first supply flowpath downstream of the flow regulator.

9. The combustor assembly of claim 8, wherein the bypass flowpath is in fluid communication with the fuel intake manifold.

10. The combustor assembly of claim 7, wherein the flow regulator comprises a spring-biased piston valve having an inlet port in fluid communication with the fuel inlet and a reference port in fluid communication with a reference pressure source, and wherein a pressure difference between the inlet port and the reference port urges a piston against a biasing force of a spring to control fuel flow through the valve to the first and second supply flowpaths.

11. The combustor assembly of claim 1, wherein the second supply flowpath comprises an electromechanically controlled flow regulation device.

12. A gas turbine engine, comprising:
    a compressor configured to produce a high-pressure airflow;
    a turbine coupled to the compressor and configured to drive the compressor; and
    a combustor assembly configured to receive the high-pressure airflow from the compressor and produce a high-temperature, high-pressure airflow to the turbine, the combustor assembly comprising:
      a primary combustion chamber in fluid communication with a primary fuel outlet of a primary fuel injector;
      a torch igniter coupled to the primary combustion chamber, the torch igniter comprising an auxiliary combustion chamber and an auxiliary fuel injector having an auxiliary fuel outlet in fluid communication with the auxiliary combustion chamber; and
      a fuel circuit comprising a first supply flowpath between a fuel inlet and the primary fuel injector, a second supply flowpath between the fuel inlet and the auxiliary fuel injector, and a bypass flowpath extending from the auxiliary fuel injector directly to the primary fuel injector,
      wherein the auxiliary fuel injector is configured to receive fuel flowing through the second supply flowpath, eject a portion of the fuel flow through the auxiliary fuel outlet and recirculate another portion of the fuel flow to the bypass flowpath.

13. The gas turbine engine of claim 12, wherein the first supply flowpath, the second supply flowpath, and the bypass flowpath are each defined by separate fluid conduits.

14. The gas turbine engine of claim 13, wherein the bypass flowpath is configured such that a pressure difference between the auxiliary fuel injector and the primary fuel injector defines a proportion of the fuel flow ejected through the auxiliary fuel outlet and the fuel flow recirculated to the bypass flowpath.

15. The gas turbine engine of claim 13, wherein the bypass flowpath comprises an electromechanically controlled flow regulation device.

16. The gas turbine engine of claim 12, wherein the bypass flowpath provides a direct line of fluid communication between the auxiliary fuel injector and the primary fuel injector.

17. The gas turbine engine of claim 16, wherein the bypass flowpath is configured to direct a bypass flow of fuel from the auxiliary fuel injector to the primary fuel injector.

18. The gas turbine engine of claim 12, wherein the fuel circuit further comprises a flow regulator configured to simultaneously adjust the rate of fuel flow from the fuel inlet to the respective first and second supply flowpaths, and the rate of fuel flow along the bypass flowpath.

19. The gas turbine engine of claim 18, wherein the primary fuel injector comprises one of multiple fuel injectors coupled to a common fuel intake manifold residing on the first supply flowpath downstream of the flow regulator.

20. The gas turbine engine of claim 19, wherein the bypass flowpath is in fluid communication with the fuel intake manifold.

21. The gas turbine engine of claim 18, wherein the flow regulator comprises a spring-biased piston valve having an inlet port in fluid communication with the fuel inlet and a reference port in fluid communication with a reference pressure source, and wherein a pressure difference between the inlet port and the reference port urges a piston against a biasing force of a spring to control fuel flow through the valve to the first and second supply flowpaths.

22. The gas turbine engine of claim 12, wherein the second supply flowpath comprises an electromechanically controlled flow regulation device.

23. A method of delivering fuel to a torch igniter and a primary combustor in a combustor assembly, the method comprising:

receiving a total burn flow of fuel;

routing a torch supply fuel flow to an auxiliary fuel injector of the torch igniter, the torch supply fuel flow comprising at least a portion of the total burn flow;

ejecting a discharge portion of the torch supply fuel flow into an auxiliary combustion chamber of the torch igniter; and recirculating a bypass portion of the torch supply fuel flow to a primary fuel injector of the primary combustor along a bypass flowpath extending from the auxiliary fuel injector directly to the primary fuel injector.

* * * * *